Feb. 3, 1925.

V. E. SODERQUIST

CARD GAME

Filed April 7, 1924

1,525,209

Witness
R. V. Rusher

Inventor
Victor E. Soderquist
by Bair & Freeman Attys.

Patented Feb. 3, 1925.

1,525,209

UNITED STATES PATENT OFFICE.

VICTOR E. SODERQUIST, OF DENVER, COLORADO.

CARD GAME.

Application filed April 7, 1924. Serial No. 704,746.

*To all whom it may concern:*

Be it known that I, VICTOR E. SODERQUIST, a citizen of the United States, residing at Denver, in the county of Denver and State of Colorado, have invented a certain new and useful Card Game, of which the following is a specification.

The object of my invention is to provide a card game comprising fifty-one cards divided into five different suits, each suit representing a political party such as the Republican party, Democratic party, the Farm-Labor party, Socialist party and the Prohibition party, each suit having ten cards therein of values from one to ten, and a card known as the dark horse, having a number ten thereon and of highest value.

The ten cards of each suit are numbered from one to ten consecutively and being known and ranked as follows: alderman, mayor, county official, State representative, State senator, governor, United States Representative, United States Senator, Vice-President and President.

Figure 1:
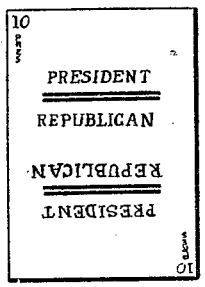
Figure 1 is a plan view of the President card of the Republican suit.
Figure 2:
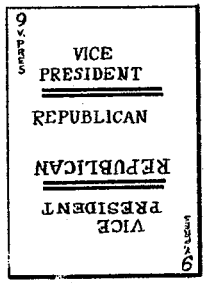
Figure 2 is a plan view of the Vice-President card of the Republican suit.
Figure 3:
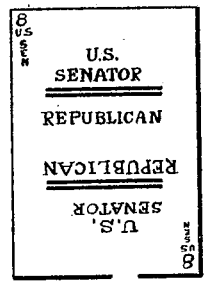
Figure 3 is a plan view of the United States Senator card of the Republican suit.
Figure 4:
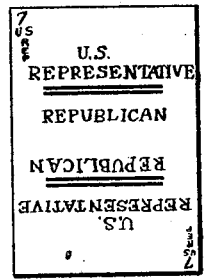
Figure 4 is a plan view of the United States Representative card of the Republican suit.
Figure 5:
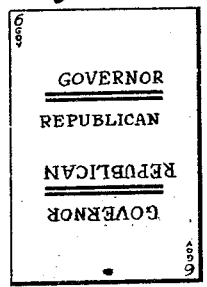
Figure 5 is a plan view of the governor card of the Republican suit.
Figure 6:
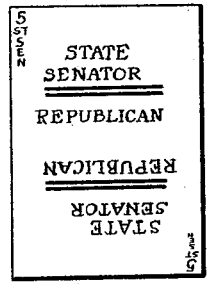
Figure 6 is a plan view of the State senator card of the Republican suit.
Figure 7:
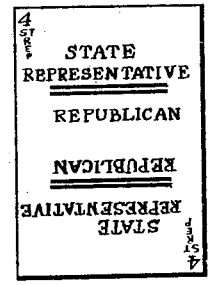
Figure 7 is a plan view of the State representative card of the Republican suit.
Figure 8:
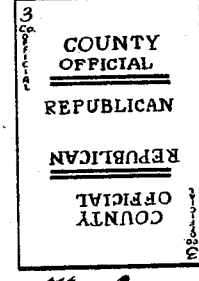
Figure 8 is a plan view of the county official card of the Republican suit.
Figure 9:
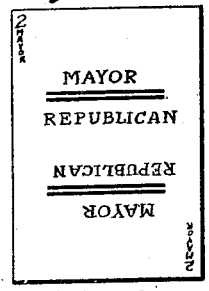
Figure 9 is a plan view of the mayor card of the Republican suit.
Figure 10:
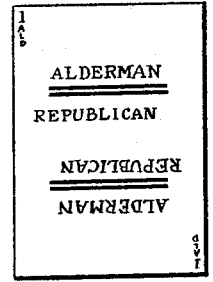
Figure 10 is a plan view of the alderman card of the Republican suit.
Figure 11:
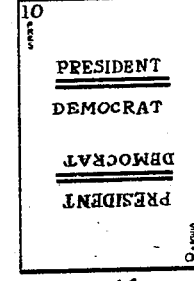
Figure 11 is a plan view of the President card of the Democratic suit.
Figure 12:
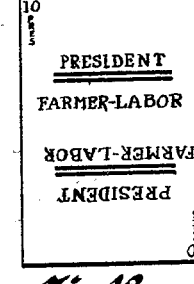
Figure 12 is a plan view of the President card of the Farmer-Labor suit.
Figure 13:
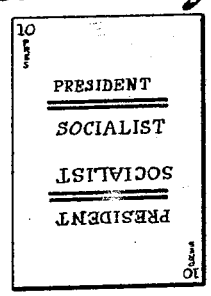
Figure 13 is a plan view of the President card of the Socialist suit.
Figure 14:
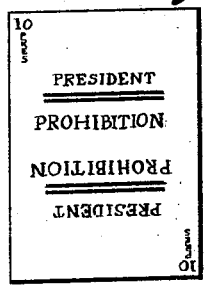
Figure 14 is a plan view of the President card of the Prohibition suit.
Figure 15:
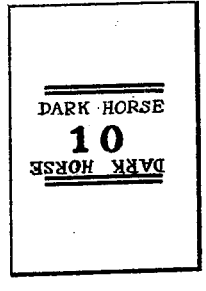
Figure 15 is a plan view of the dark horse card.

Each of the cards has a number on it from 1 to 10 and the rank or taking power of the individual card is as follows:

| | |
|---|---|
| Dark horse | First |
| President | Second |
| Vice President | Third |
| U. S. Senator | Fourth |
| U. S. Representative | Fifth |
| Governor | Sixth |
| State senator | Seventh |
| State representative | Eighth |
| County official | Ninth |
| Mayor | Tenth |
| Alderman | Eleventh |

The number on each card represents the voting counting power of the individual card and are arranged so that each card counts for a certain amount of votes, as follows:

| | |
|---|---|
| Dark horse | 10 |
| President | 10 |
| Vice President | 9 |
| U. S. Senator | 8 |
| U. S. Representative | 7 |
| Governor | 6 |
| State senator | 5 |
| State representative | 4 |
| County official | 3 |
| Mayor | 2 |
| Alderman | 1 |

The object of the game is to acquire a certain amount of votes so as to be in line for one of the offices mentioned on the cards, and it is necessary to secure the full amount of votes for the various offices.

Office of— Votes.

| | |
|---|---|
| President | 90 |
| Vice President | 85 |
| U. S. Senator | 80 |
| U. S. Representative | 75 |
| Governor | 70 |
| State senator | 65 |
| State representative | 60 |
| County official | 55 |
| Mayor | 50 |
| Alderman | 45 |

The game is played when there are five players, by dealing out nine cards to each player, each player having picked one of the various political parties for his party and then there are six cards left, which are placed in what is known as the unknown vote.

When there are four players playing, then one complete suit is omitted from the deck and in that case, each player receives nine cards, with five cards placed in the unknown vote.

When there are three players playing then three suits are used and the cards are dealt out nine to each party with four cards in the unknown vote.

When there are two players playing, then all of the suits are taken from the deck with the exception of two and the cards are dealt out nine to each party, with three cards placed in the unknown vote. The unknown vote is placed in the center of the table and belongs to the dealer of the cards, and can be auctioned off to the highest bidder for any number of votes.

For example, if the dealer decides to sell the unknown vote and is offered ten votes for the same, then he gets ten votes added to his total at the end of the game, his ten votes being good for any particular office.

The party purchasing the unknown vote, and who offers the ten votes is then required to get ten votes more than is ordinarily required to get into any particular office.

When a party purchases the unknown vote, he is then compelled to discard a like number of cards which are properly termed the absent vote.

The party on the left of the dealer then begins to play the cards and from then on the cards rank according to the numbers thereon and it is necessary for the parties to follow suit as long as they have cards of that particular suit, and thereafter can play any cards they desire.

The numbers on the cards are added up after the complete game has been played and the office acquired depends upon the number of votes secured, for example, if one party has secured 68 votes, he then becomes senator and from then on it is his desire to go to a governor and up the rank until he becomes President.

It is quite difficult to become a President without playing a great many times, due to the fact that it is necessary to secure almost every vote in order to get the number required to become a President.

When the dealer sells the unknown vote, he is permitted to use the amount of votes if he sells his unknown vote for ten votes and receives thirty-six votes more in the cards received, he adds the ten to the thirty-six, making a total vote of forty-six, which makes him an alderman.

The party purchasing the unknown vote and having paid ten votes for the same is required, in order to attain any office, to add to that amount the number of votes required for the office. For example, it is necessary to get fifty-five votes for alderman instead of forty-five.

The game is used as a political one and is educative in that it teaches the various prominent political parties and at the same time, gives the lowest office as an alderman and the steps and rank of each office up to the President.

The object of the game is to see who can become President first in an evening's playing.

Ordinarily, when the game is played it is necessary for a man to advance in office, that is, he must first become an alderman and then a mayor, etc. until he reaches the office of President.

The dark horse card works with any suit and can be played " wild " and can be used to take in any other card. The dark horse card is quite desirable for use in getting into the lead when several players are playing, because it will take in any of the other fifty cards of the deck. The dark horse has number 10 thereon and is valued as ten votes.

I claim as my invention:

A card game comprising fifty-one cards, including five suits of ten cards each, each suit representing a political party, to wit: Republican, Democrat, Farmer-Labor, Socialist and Prohibition, each suit having an alderman card, a mayor card, a county official card, a State representative card, a State senator card, a governor card, a United States Representative card, a United States Senator card, a Vice President card and a President card, each of said cards of each suit having numbers thereon from one to ten and a dark horse card having a number ten thereon, said cards having values corresponding to the number thereon.

Des Moines, Iowa, March 31, 1924.

VICTOR E. SODERQUIST.